United States Patent Office 3,684,734
Patented Aug. 15, 1972

3,684,734
POLYMERS OF ALKYLENE OXIDES AS CRUDE OIL DEMULSIFIERS
Gert Liebold, Mannheim, and Knut Oppenlaender, Ludwigshafen, Germany, assignors to Badische Anilin- & Soda-Fabrik Aktiengesellschaft, Ludwigshafen (Rhine), Germany
No Drawing. Filed Aug. 11, 1970, Ser. No. 63,028
Claims priority, application Germany, Aug. 13, 1969,
P 19 41 173.5
Int. Cl. B01d 17/04
U.S. Cl. 252—342
4 Claims

ABSTRACT OF THE DISCLOSURE

The use of derivatives of block copolymers of ethylene oxide and of 1,2-propylene oxide as demulsifiers for crude oil emulsions; mainly those derivatives are used which are obtained by reacting the polymers with hydroxy carboxylic acids.

---

The present invention relates to the use of new derivatives of block copolymers of ethylene oxide and of 1,2-propylene oxide as demulsifiers for crude oil emulsions.

Block copolymers of ethylene oxide and 1,2-propylene oxide as such are known. However, they are not unrestrictedly suitable for water-in-oil emulsions containing predominantly oil.

Demulsification of this type of emulsion is, however, an important problem in the mineral oil industry, and although a number of solutions to it are known, they meet all demands only in exceptional cases. The previously known demulsifiers for water-in-oil emulsions, which largely consist of a variety of alkylene oxide polymers and compounds derived therefrom, all having hydrophilic end groups, are frequently too slow in operation and, after use, leave unduly large concentrations of residual water and residual salt in the oil or they provide satisfactory results only with a few types of oil.

It is an object of the invention to provide a universally applicable demulsifier for water-in-oil emulsions which does not have the aforementioned drawbacks.

We have found that this and other objects and advantages of the invention are achieved by derivatives of block polymers of ethylene oxide and 1,2-propylene oxide.

According to the invention the derivatives used are the reaction products of the block polymers of ethylene oxide and 1,2-propylene oxide with hydroxy carboxylic acids, which may optionally be polyoxyethylated and/or polyoxypropylated at their free hydroxyl groups.

The structure and production of the new derivatives of block polymers of ethylene oxide and 1,2-propylene oxide used in accordance with the present invention for breaking petroleum emulsions are illustrated below by a simplified set of formulae.

Suitable derivatives are obtained when block polymers of the structure $$A—B—A \quad (I)$$

in which A stands for poly(ethylene oxide) blocks of average molecular weight $M_A$ of from 600 to 2,000 and B stands for a poly(1,2-propylene oxide) block of average molecular weight $M_B$ of from 800 to 5,000, that is:

$$HO_y(H_4C_2O)(C_3H_6O)_x(C_2H_3O)_yH$$

where $x$ equals 14 to 70 and $y$ equals 13 to 46, are converted with hydroxy carboxylic acids (II), for example aromatic or aliphatic monocarboxylic acids (IIa), dicarboxylic acids (IIb) or tricarboxylic acids (IIc), to the corresponding esters in known manner.

For example

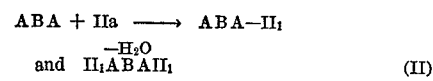

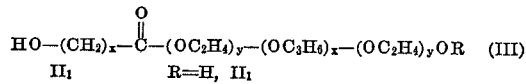 (III)

Another example is, using IIb (to give II$_2$):

$$RABA(II_2—ABA)_nII_2—ABAR \quad (IV)$$
$$n=0.5 \quad R=H, II_2$$

and II$_2$—ABA—II$_2$, etc.

Using IIc (to give II$_3$):

$$RABA[II_3—(ABA)_m]_n—II_3(ABA)_mR \quad (V)$$
and II$_3$ABAII$_3$, etc.

$R=H, II_3$
$n=0-5$
$m=1-2$.

The esters III–V may then be polyoxyethylated and/or polyoxypropylated at the terminal hydroxyl groups of the polyether chain ABA and of the hydroxy carboxylic acid. The reactions with the alkylene oxides may also be carried out in known manner using alkaline catalysts such as NaOCH$_3$ or NaOH$_3$ at from 125° to 135° C. and give the following products:

Example relating to III:

$$H_z(OH_{2n}C_n)ABA—II_1(C_nH_{2n}O)_zH \quad (IIIa)$$

$n=2$ and/or 2
$Z=10-100$.

Similarly, relating to IV and V (to give IVa and Va):

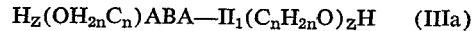
etc.

The block polymer I may be obtained in known manner from poly(1,2-propylene oxide) and ethylene oxide. We prefer those polymers in which the units A and B have approximately the same molecular weights $M_A$ and $M_B$ or in which $M_A$ is not less than $0.6M_B$ or vice versa.

Examples of suitable hydroxy carboxylic acids (IIa, IIb and IIc) are glycolic acid, lactic acid, malic acid, tartaric acid, α-hydroxy isobutyric acid, hydroxy pivalic acid, hydroxy valeric acid, α- and β-hydroxy caproic acids, citric acid, p-hydroxybenzoic acid, ricinoleic acid, 12-hydroxy stearic acid and mixtures thereof.

In place of the free acids it is possible to use their functional derivatives, for example the anhydrides, the $C_1$ to $C_4$ alkyl esters (trans-esterification) or the chlorides.

The block polymer and the hydroxy carboxylic acid react in stoichiometric amounts according to the values of $n$ or $m$. However, to achieve substantially complete esterification, it is advisable to use the block polymer in molar excess of up to 10%.

The esterification may be effected with or without solvents or diluents at temperatures up to 150° to 180° C. Suitable solvents are, for example, tetrahydronaphthalene or perhydronaphthalene.

The reaction may, if desired, be accelerated by the use of esterification catalysts such as p-toluene sulfonic acid, sulfuric acid or hydrogen chloride in quantities of from 0.5 to 1% of the amount of block polymer used.

The demulsifiers of the invention may be used in concentrations of from 0.0005 to 0.1% by weight of the weight of the emulsions being broken for separating the water from the mineral oils present in said emulsions, which oils may be of any type and source and may be present in any proportion. They may therefore be used for water-in-oil emulsions containing from approximately 0.1 to 90% of water by weight, dosage being facilitated by using the demulsifier in aqueous solutions of concentrations ranging from about 1 to 10%. The water separation is conveniently carried out at temperatures ranging from 40 to 80° C.

As examples of oils there may be mentioned such differing sources as Rühlermoor, Rühlertwist, Adorf (Emsland), Amal, Sarir (Libya), Agha Jari, Saffaniya, Kuwait, Oman (Near East), Tia Juana, Bachaquero (Venezuela) and Nigeria.

EXAMPLES

In each case 1 mole of an ethylene oxide/1,2-propylene oxide block polymer of the structure ABA, A=poly(ethylene oxide) unit, B=poly(propylene oxide) unit, characterized by the average partial molecular weights $M_A$ and $M_B$ determined from the hydroxyl value and oxide take-up, is reacted at 150° C. with $x$ g. of a hydroxy carboxylic acid (IIa–IIc) (equivalent to $y$ moles), with the addition of small amounts of sulfuric acid, to form products of the structure given under III to V above.

200 g. of a crude oil emulsion containing $p$ ml. of water are vigorously stirred at 80° C. with $q$ mg. of the from 0.0005 to 0.1% by weight of the esterification product of
(a) a black copolymer of the formula $$A—B—A \quad (I)$$

in which A denotes a polyethylene oxide block of average molecular weight $M_A$ of from 600 to 2000 and B denotes a poly-1,2-propylene oxide block of average molecular weight $M_B$ of from 800 to 5000, with
(b) an aliphatic or aromatic hydroxymonocarboxylic hydroxydicarboxylic or hydroxytricarboxylic acid, said esterification being performed by reacting (a) and (b) in stoichiometric amounts according to the number of carboxylic groups in (b) or in a molar excess of (a) of up to 10%.

2. A process as in claim 1 wherein the esterification product of (a) and (b) is additionally reacted on the terminal hydroxyl groups of the polyether chains ABA and of the hydroxy carboxylic acid with
(c) 10 to 100 moles of ethyleneoxide, 1,2-propylene oxide or mixtures thereof.

3. A process as in claim 1 wherein the esterification product is added as a 1 to 10% aqueous solution at temperatures ranging from 40° to 80° C.

4. A process as in claim 1 wherein said hydroxy car-

TABLE

| Block polymer | | Hydroxy carboxylic acid | Molar ratio. ABA: hydroxy acid | Moles EO and/or PrO(M') | Crude oil | p, ml. | q, mg. | $t_1$ min. | $t_2$ min. | Z, percent |
|---|---|---|---|---|---|---|---|---|---|---|
| $M_A$ | $M_B$ | | | | | | | | | |
| 1,200 | 4,600 | Lactic | 1:1 | | Rühlermoor | 132 | 10 | 10 | 20 | 0.5 |
| 1,200 | 4,600 | p-Hydroxybenzoic | 1:2 | | do | 132 | 10 | 5 | 10 | 0.3 |
| 1,200 | 4,600 | Hydroxy isobutyric | 1:1 | | do | 132 | 10 | 15 | 25 | 0.3 |
| 600 | 2,300 | Hydroxycaproic | 1:1 | 36 EO | Adorf | 110 | 8 | 5 | 10 | 0.2 |
| 600 | 2,300 | do | 1:1 | | do | 110 | 8 | 10 | 15 | 0.3 |
| 600 | 2,300 | Citric | 3:1 | | Rühlermoor | 132 | 5 | 10 | 20 | 0.2 |
| 600 | 2,300 | do | 3:1 | | Kuwait | 50 | 5 | 10 | 20 | 0.3 |
| 600 | 2,300 | do | 2:1 | | Rühlermoor | 132 | 10 | 10 | 25 | 0.4 |
| 600 | 2,300 | Malic | 1:1 | | do | 150 | 8 | 10 | 20 | 0.5 |
| 600 | 2,300 | Tartaric | 1:1 | | do | 150 | 8 | 10 | 20 | 0.4 |
| Comparative substances | | | | | | | | | | |
| 600 | 2,300 | | | | do | 132 | 10 | 30 | 45 | 0.8 |
| 600 | 2,300 | | | | Adorf | 110 | 8 | 30 | 40 | 0.8 |
| 600 | 2,300 | | | | Kuwait | 50 | 5 | 30 | 40 | 0.5 |
| 580 | 1,750 | | | | Rühlermoor | 132 | 10 | 20 | 30 | 0.5 |
| 500 | 1,550 | | | | do | 132 | 10 | 25 | 35 | 0.5 | products of the process of the invention or with non-esterified demulsifiers for comparison. The mixture is then allowed to stand at 80° C. The amount of clearly separated water is measured. The time $t_1$ is that at which 85% by weight of the water has separated and the time $t_2$ is that at which the oil has a residual water content of only 2%.

The test data are given in the above table, from which the superiority of the products of the invention over previously known demulsifiers is clearly evident.

We claim:
1. A process for breaking crude oil emulsions of the water-in-oil type with the aid of polymers of alkylene oxides, comprising adding to the water-in-oil emulsions boxylic acid is selected from the group consisting of glycolic acid, lactic acid, malic acid, tartaric acid, α-hydroxy isobutyric acid, hydroxy pivalic acid, hydroxy valeric acid, α- and β-hydroxy caproic acids, citric acid p-hydroxybenzoic acid, ricinoleic acid, 12-hydroxy stearic acid and mixtures thereof.

References Cited

UNITED STATES PATENTS 3,110,682   11/1963   De Groote _____ 252—331

JOHN D. WELSH, Primary Examiner

U.S. Cl. X.R.

252—340